United States Patent [19]

Hodrien et al.

[11] Patent Number: 5,255,504

[45] Date of Patent: Oct. 26, 1993

[54] ELECTRICAL POWER GENERATION

[75] Inventors: Ronald C. Hodrien, Solihull; Philip A. Borrill, Warwick; Deborah J. Brown, Solihull, all of United Kingdom

[73] Assignee: British Gas PLC, London, United Kingdom

[21] Appl. No.: 841,507

[22] Filed: Feb. 26, 1992

[30] Foreign Application Priority Data

Mar. 6, 1991 [GB] United Kingdom .................. 9104715

[51] Int. Cl.$^5$ ............................................. F02B 43/00
[52] U.S. Cl. .................... 60/39.02; 60/39.12; 208/414; 48/210
[58] Field of Search .................. 60/39.02, 39.12; 208/414, 419, 427; 48/197 R, 210

[56] References Cited

U.S. PATENT DOCUMENTS

| 3,986,349 | 10/1976 | Egan | 60/39.02 |
|---|---|---|---|
| 3,991,557 | 11/1976 | Donath | 60/39.12 |
| 4,277,416 | 7/1981 | Grant | 48/210 |
| 4,353,214 | 10/1982 | Gardner | 60/39.52 |
| 4,478,039 | 10/1986 | Horgan | |
| 4,594,140 | 6/1986 | Cheng | 208/414 |
| 4,631,915 | 12/1986 | Frewer et al. | 60/39.12 |
| 4,689,139 | 8/1987 | Wurfel | 208/419 |
| 4,896,498 | 1/1990 | Knizia | 60/39.12 |

FOREIGN PATENT DOCUMENTS

| 10284853 | 10/1988 | European Pat. Off. | |
|---|---|---|---|
| 0251780 | 11/1987 | Fed. Rep. of Germany | 208/419 |
| 2121426 | 12/1983 | United Kingdom | |
| 2210105 | 6/1989 | United Kingdom | |

Primary Examiner—Richard A. Bertsch
Assistant Examiner—Michael I. Kocharov
Attorney, Agent, or Firm—Oblon, Spivak, McClelland, Maier & Neustadt

[57] ABSTRACT

A method for combined cycle electrical power generation comprises utilizing a coal hydrogenator 2 and a reactor 1 for producing from a methane-rich gas a hot crude hydrogen-containing gas which is fed directly (apart from an optional quenching stage) to the coal hydrogenator. The coal hydrogenator produces gaseous and liquid products which are combusted to drive a gas turbine 5 which drives an electrical generator 6. The hydrogenator also produces char which is combusted in a boiler 10 to form steam to drive a steam turbine 11 which, in turn, drives another electrical generator 12. Such direct use of the hot crude gas avoids having to preheat hydrogen-containing feed to the hydrogenator.

8 Claims, 1 Drawing Sheet

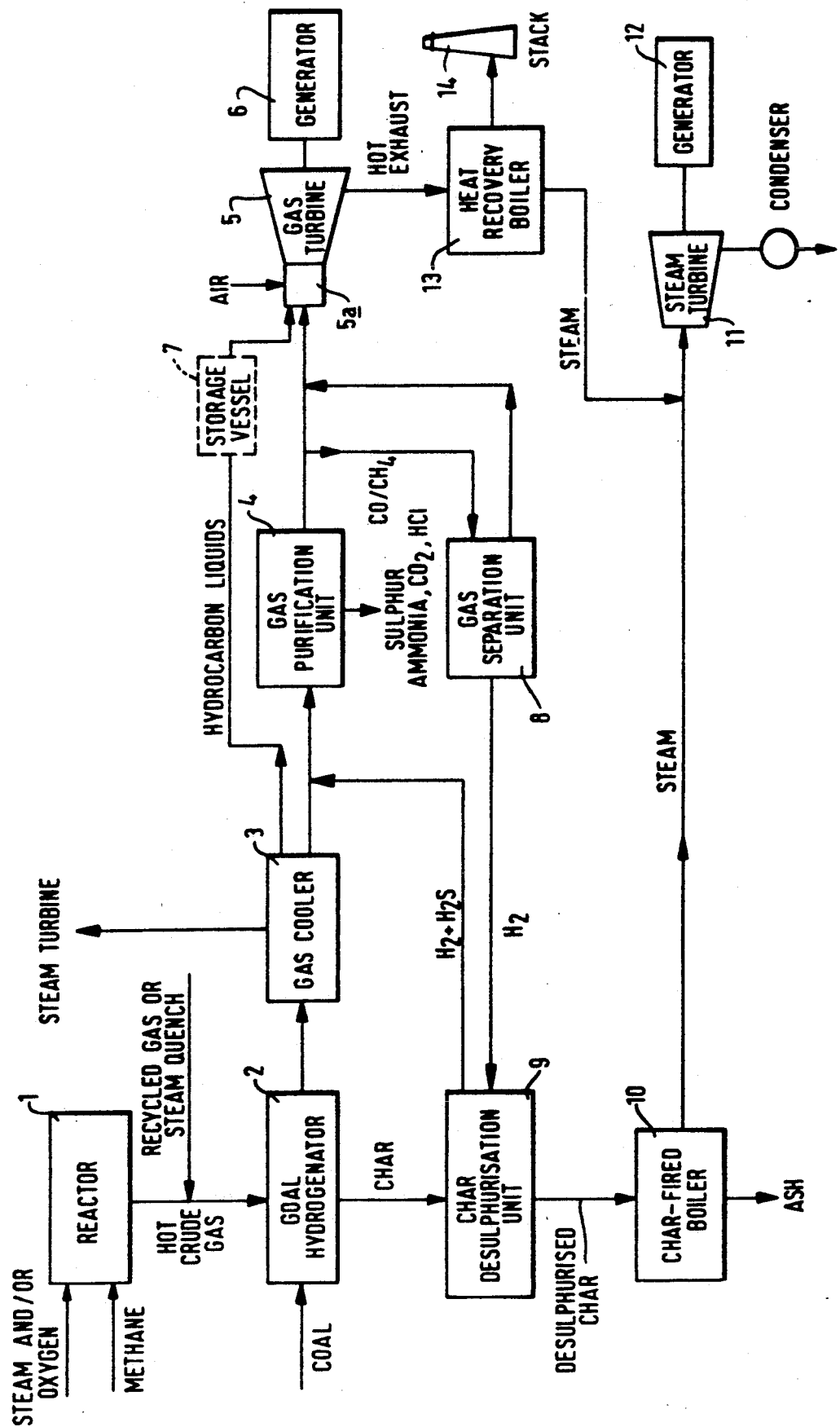

ELECTRICAL POWER GENERATION

The invention relates to electrical power generation and, more particularly, to a method for combined cycle electrical power generation.

An object of the invention is to provide such a method which utilises a coal hydrogenation process.

According to the invention a method for combined cycle electrical power generation comprises introducing a methane-rich gas and steam and/or oxygen-containing gas into a reactor; reacting the methane-rich gas at an elevated temperature with the steam and/or oxygen-containing gas to form a hot hydrogen-containing gas; introducing into a coal hydrogenator coal and at least a portion of the hydrogen-containing gas at an elevated temperature suitable for initiating and maintaining coal hydrogenation reaction; hydrogenating the coal with the hydrogen-containing gas in the hydrogenator to form a char and a first gaseous product; removing the char and removing the first gaseous product from the hydrogenator; cooling the first gaseous product to form a condensed liquid hydrocarbon product and a remaining gaseous product; separating the liquid hydrocarbon product from the remaining gaseous product; removing impurities from the remaining gaseous product; feeding at least a portion of the purified remaining gaseous product to the combustion chamber of a gas turbine to form gaseous combustion products to drive the turbine whereby the gas turbine drives a first electrical generator to produce electrical power; and introducing at least some of the char into a boiler and combusting the char therein with air to produce steam to drive a steam turbine whereby the steam turbine drives a second electrical generator to produce electrical power. One or more gas turbines may be driven by the combustion products and one or more steam turbines may be driven by the steam produced.

Prior to the hot hydrogen-containing gas being introduced into the coal hydrogenator, such hydrogen-containing gas may be cooled to a relatively cooler temperature in order to obtain the said elevated temperature suitable for initiating and maintaining the coal hydrogenation reaction in the hydrogenator. It will be appreciated that with or without this cooling step, the hot hydrogen-containing gas can be/is fed from the reactor to the coal hydrogenator without an intermediate heating stage.

Known reaction processes may be used to convert the methane-rich gas into the hot hydrogen-containing gas, such as, high temperature steam reforming or partial oxidation processes. For example, in the reactor, the methane-rich gas may be mixed with steam and reacted therewith in the presence of a steam-reforming catalyst to form the hydrogen-containing gas, or as an alternative, the methane-rich gas may be mixed with the oxygen-containing gas (and, optionally, in addition with steam and/or carbon dioxide) and reacted therewith so as to cause a partial oxidation reaction which produces the hydrogen-containing gas.

Applicants believe that in previous proposals, before being utilised downstream of the reactor, hot product gas mixture resulting from such methane-rich conversion reactions has been cooled and subjected to a variety of catalytic conversion steps and purification steps using solid absorbents or liquid washing processes to reduce the contents of carbon monoxide, carbon dioxide, methane and steam. It is also believed that some of such processes usually operate at relatively low temperatures, for example about 100° C., and thus the resulting gas has relatively little useful heat content. Coal hydrogenation processes have usually been proposed for the manufacture of methane-rich fuel gases such as substitute natural gas (SNG) and for this purpose a hydrogen-rich feed gas containing typically at least 80% vol. hydrogen produced by purification steps as just mentioned above has been required. Use of such resulting cooled, purified gas has required the provision of extensive preheating systems to meet the higher temperatures, typically 650° to 950° C., required in the coal hydrogenator. However, as regards the method of the present invention, applicants consider that impurities in the product gas from the reactor are not particularly critical and accordingly can use the hot, crude hydrogen-containing product gas from the reactor directly (or directly apart from a cooling or quenching step) in the coal hydrogenator. As will be appreciated this 'direct' use of the hot, crude hydrogen-containing gas obviates the expense and complexity of the conversion and purification steps and the hydrogen pre-heating step before introduction into the coal hydrogenator. This in turn can lead to significant reduction in costs and increase in efficiency.

The purified remaining gaseous product may be separated into a first separated gas, which is a hydrogen-rich gas, and a second separated gas, which comprises methane and carbon monoxide, and wherein, prior to the char being introduced into the boiler, the char may be contacted with the first separated hydrogen-rich gas to cause desulphurisation of the char. At least a portion of the second separated gas may be mixed with the purified remaining gaseous product portion being fed to the gas turbine(s).

Hydrogen sulphide and hydrogen-containing gases which result from the desulphurisation of the char may be separated from the desulphurised char and then mixed with the remaining gaseous product prior to the removal of impurities from the remaining gaseous product.

At least a portion of the liquid hydrocarbon product separated from the remaining gaseous product may be fed to the combustion chamber of a gas turbine to form gaseous combustion products to drive the gas turbine to drive an electrical generator to produce electrical power. This gas turbine may be the gas turbine, or one of the gas turbines, which is driven via the purified remaining gaseous product. Alternatively, the gas turbine driven via the liquid hydrocarbon product may be a separate turbine.

Some or all of the liquid hydrocarbon products may be stored and from store, as required, be used at times of increased or peak power demand. Such storage may avoid the need to purchase suitable liquid fuels or synthesise them. Optionally, liquid hydrocarbon products from such store may be sold as a fuel or chemical feedstock.

Hot exhausted combustion products from the, or any of the, gas turbines (whether utilizing the purified remaining gaseous product or the liquid hydrocarbon products) may be passed through one or more waste heat boilers to produce further steam to drive one or more steam turbines to drive an electrical generator to produce electrical power. This or these steam turbines may be the, or one of the, steam turbines driven by the steam produced by the combustion of the char, or alternatively the, or each steam turbine driven by steam from the waste boiler(s) may be a separate turbine.

From the above it will be appreciated that electrical power can be generated usefully from liquid, gaseous and char products produced by the coal hydrogenator.

Although new plant may be constructed to perform the invention, the method or process scheme described above is considered to be particularly suitable for 'retrofitting' to an existing coal-fired power station. It is envisaged that the char could be fed to an existing coal-fired boiler with only relatively minor modifications to the burners and fuel supply system being required. With such a retrofit the power output could be maintained or increased. Moreover, unlike the case with schemes based on coal gasification processes in which substantially all of the coal is converted directly into gaseous products, this retrofit enables a considerable proportion of the total power output to be generated by utilizing known boiler/steam turbine technology with which the operators may be most familiar.

In order that the invention may be more readily understood, reference will now be made, by way of example, to the accompanying drawing which is a schematic diagram illustrating the method of the invention.

Referring to the drawings, methane-rich gas, such as natural gas, and steam and/or oxygen-containing gas are introduced into a reactor 1 wherein the methane-rich gas is caused to react at an elevated temperature with the steam and/or oxygen to form a hot, crude hydrogen-containing gas. Such reaction may be provided by a high temperature steam reforming process in which the methane-rich gas has previously been purified to meet the requirements of a steam reforming catalyst to be used, and is then mixed with an excess of steam (typically 3-5 mol/mol carbon in feed) and reacted in the reactor 1 over the catalyst (such as a suitable supported nickel based proprietary catalyst) at a temperature of 750°-900° C. and a pressure of from 1 to 35 bar. As an alternative example, such reaction may be provided by a high temperature partial oxidation process in which the methane-rich gas is mixed with an oxygen-containing gas (and, optionally, in addition with steam or carbon dioxide) and reacted in reactor 1 in a partial combustion reaction at a temperature of 1250° to 1500° C. and at a pressure of from 1 to 100 bar. The reaction may occur over a suitable catalyst present in the reactor vessel.

Coal and the hot, crude hydrogen-containing gas produced in the reactor 1 are fed into a coal hydrogenator 2. The hot, crude gas may be fed either directly from the reactor 1 to the hydrogenator 2 or, alternatively, if the crude gas from the reactor 1 is at too high a temperature, then before introduction into the hydrogenator 2, it may be directly cooled or quenched to a desired hydrogenator inlet temperature, for example by the addition of fluids such as steam, water or relatively cool product gas recycled from a point downstream in the scheme. By either route the hot, crude gas provides the reaction heat in the hydrogenator 2.

Thus, the coal and hot crude gas are fed into the hydrogenator at an elevated pressure and an elevated temperature suitable for initiating and maintaining coal hydrogenation reactions so that the coal is hydrogenated by the hydrogen-containing gas to form a char and a first gaseous product. The char and the first gaseous product are removed from the hydrogenator 2. The first gaseous product is passed to a gas cooler 3 where a condensed liquid hydrocarbon product and a remaining gaseous product are formed from the first gaseous product. This remaining gaseous product leaving the gas cooler 3 is passed through a gas purification unit 4 where impurities such as hydrogen sulphide, carbon dioxide, hydrogen chloride and ammonia are removed. At least a portion of the purified gaseous product which comprises methane, carbon monoxide and hydrogen and exits from the gas purification unit 4 is fed to a gas turbine 5 where it is combusted with air in the combustion chamber 5a of the turbine 5 to form gaseous combustion products to drive the turbine which in turn drives a first electrical generator 6 to produce electrical power.

The liquid hydrocarbon product, which would typically comprise a mixture of aromatic hydrocarbons, may also be fed to the combustion chamber 5a and combusted therein with air to form further gaseous combustion products to drive the turbine.

Alternatively, the liquid hydrocarbon may be fed to a storage vessel 7 from which the liquid may be drawn as required and fed to the combustion chamber 5a.

A further portion of the purified gaseous product exiting from the purification unit 4 may be passed to a gas separation unit 8 wherein the gaseous product is separated into a first separated gas which is a hydrogen-rich gas (i.e. at least 50% wt/wt hydrogen) and into a second separated gas which comprises methane and carbon monoxide.

While still under an elevated pressure and at hydrogenator exit temperature, the char is fed from the hydrogenator 2 into a desulphurisation unit 9 in which a bed of the char may be held for an average period of 1 to 20 minutes at a temperature of 750° to 900° C. and a pressure of at least 20 bar while the first separated hydrogen-rich gas is passed through the bed to cause desulphurisation of the char. The temperature may conveniently be maintained, if desired, by injecting small quantities of air or oxygen to induce combustion of part of the hydrogen-rich gas. The char is then cooled and reduced in pressure (and optionally stored) before being used as described below.

The second separated gas, from the separation unit 8, which comprises methane and carbon monoxide is mixed with that portion of the purified remaining gaseous product being fed to the gas turbine 5.

As a result of the char desulphurisation, hydrogen sulphide and hydrogen-containing gases are formed and these gases are separated from the desulphurised char and are mixed with the gaseous product exiting from the gas cooler unit 3 and prior to introduction into the gas purification unit 4.

At least a portion of the desulphurised char from the desulphurisation unit 9 is fed to a char-fired boiler 10 where the char is combusted with air to produce steam which drives a steam turbine 11 which in turn drives a second electrical generator 12 to produce electrical power.

Hot gaseous combustion products are exhausted from the gas turbine 5 and are passed through a waste heat or heat recovery boiler 13 to produce further steam which drives the steam turbine 11 which in turn drives the electrical generator 12.

Waste gaseous flue products from the boiler 13 are led away to the stack 14 without further clean up.

The coal feed to the hydrogenator 2 may be prepared by drying and grinding to an appropriate size range to suit the hydrogenation process.

Where water or steam is used as coolant in the gas cooler 3 and suitable steam is formed as a result of the heat exchange with the hot first gaseous product, such resulting steam may be used to drive the steam turbine 11 or a separate steam turbine (not shown).

Any unreacted hydrogen contained in the gases exiting from the purification unit 4 may, optionally, be recovered by known means for recycle to the hydrogenator 2.

The use of coal hydrogenation in the scheme described above is advantageous because both char and liquid fuels can be produced which contain sufficiently low amounts of sulphur, nitrogen and chlorine (which are all precursors of 'acid rain' emissions) that a high reduction of 'acid rain' emissions is already achieved without the need for disadvantageous and expensive downstream treatment of the flue gases, such as NOX removal and desulphurisation. In the process described above contaminants (including S, N and Cl) are removed in a chemically reduced form into the product gas stream, from which they may be economically removed to lower levels using a variety of known gas treating processes. The equipment may be made compact because of high operating pressures (leading to small gas volume) and very rapid reaction rates in hydrogen.

Although in the Applicants above described scheme methane is consumed in making the hydrogen used by the coal hydrogenator, Applicants investigations have indicated that an equal or larger quantity of combustible fuel gases can be produced from the coal and made available to the gas turbine with little net thermal losses.

Applicants believe that a previous practice has been to feed methane directly to a gas turbine and to burn coal directly in a coal-fired boiler to produce steam for a steam turbine. Alternatively, it has been previously proposed that coal and methane be fired jointly as fuel in a boiler. It is considered that such previous practices required extensive downstream treatment of the flue gas in order to achieve the same level of S, N and Cl emissions reduction which it is believed can be achieved with the Applicants investigations have shown that a coal hydrogenation process based on that described in published UK patent application No. 2121426 A is particularly advantageous for the hydrogenation step in the present scheme because:

a) high efficiency can be achieved with the process, b) controlled quantities of clean hydrocarbon liquid fuel products can be produced without the use of extreme operating conditions, c) a combination of hydrogenator arrangement and operating conditions can be employed which has been found to lead to a very low level of S, N and Cl containing contaminants in both the char and the liquid products; typically, the levels of removal of S, N and Cl are: S-70 to 85%, N-45 to 55%, Cl-90 to 95% (and by using the additional char desulphurisation step—see unit 9 in drawing—it has been found that the removal of S may be increased to 90% or more), a char which is both particularly combustible (and therefore particularly suitable for feed to the char-fired boiler 9) and very reactive towards further rapid desulphurisation in an atmosphere containing hydrogen at elevated pressures (as in unit 8)

and a liquid product which is of low boiling range and low viscosity and thus readily combustible as a gas turbine or boiler fuel, or valuable as a product for fuel or chemical uses, and d) the use of a conventional size grade of coal, known as pulverised fuel, results in a char with a suitable size range for use in conventional boilers designed for pulverised fuel firing and especially useful in a retrofit situation.

Applicants investigations into the use of the coal hydrogenation process described in UK 2121426 A but using nitrogen and not hydrogen as the coal transport gas, have indicated that good yields of high quality liquids, representing up to about 18% of the carbon content of the coal, can be obtained at convenient and efficient operating conditions of: pressures above 20 bar; reaction times of 5 to 50 seconds; temperatures of 750° to 870° C.; and a gas recirculation ratio of 2 to 10 vol/vol. It has been found that these conditions lead to good thermal efficiency and less severe duty for materials of construction of the hydrogenator. It is believed that this is due to the beneficial effects of the internal recirculation of gas in this reaction process which stabilises the conversion process at these milder conditions. It has also been found that the hydrocarbon liquids produced are lighter, more volatile and less viscous in nature and substantially free of troublesome heavy residual or 'pitch' fraction which can result from other thermal coal conversion processes, such as coke ovens (carbonisation) or coal liquefaction. In particular, Applications investigations have shown that the hydrocarbon liquids produced in their process can contain 30 to 90% of valuable benzene.

We claim:

1. A method for combined cycle electrical power generation comprising—

(i) introducing a methane-rich gas and at least one of steam and oxygen-containing gas into a reactor, reacting the methane-rich gas at an elevated temperature with the at least one of steam and oxygen-containing gas to form a hot hydrogen-containing gas;

(ii) introducing into a coal hydrogenator coal and at least a portion of the hydrogen-containing gas at an elevated temperature suitable for initiating and maintaining coal hydrogenation reaction, hydrogenating the coal with the hydrogen-containing gas in the hydrogenator to form a char and a first gaseous product; removing the char and removing the first gaseous product from the hydrogenator;

(iii) cooling the first gaseous product to form a condensed liquid hydrocarbon product and a remaining gaseous product; separating the liquid hydrocarbon product from the remaining gaseous product;

(iv) removing impurities from the remaining gaseous product;

(v) feeding at least a portion of the purified remaining gaseous product to the combustion chamber of a gas turbine to form gaseous combustion products to drive the turbine whereby the gas turbine drives a first electrical generator to produce electrical power;

(vi) introducing at least some of the char into a boiler and combusting the char therein with air to produce steam to drive a steam turbine whereby the steam turbine drives a second electrical generator to produce electrical power, wherein a portion of the purified remaining gaseous product is separated into a first separated gas, which is a hydrogen-rich gas, and a second separated gas, which comprises methane and carbon monoxide, and wherein, prior to the char being introduced into the boiler, the char is contacted with the first separated hydrogen-rich gas to cause desulphurisation of the char.

2. A method as claimed in claim 1, in which in the reactor the methane-rich gas is mixed with steam and reacted therewith in the presence of a steam-reforming catalyst to form the hydrogen-containing gas.

3. A method as claimed in claim 1, in which in the reactor the methane-rich gas is mixed with the oxygen-containing gas and reacted therewith so as to cause a partial oxidation reaction which produces the hydrogen-containing gas.

4. A method as claimed in any of the preceding claims, in which prior to the hot hydrogen-containing gas being introduced into the coal hydrogenator, such hydrogen-containing gas is cooled to a relatively cooler temperature in order to obtain the said elevated temperature suitable for initiating and maintaining the coal hydrogenation reaction in the hydrogenator.

5. A method as claimed in claim 1, in which at least a portion of the second separated gas is mixed with the purified remaining gaseous product portion being fed to the gas turbine.

6. A method as claimed in claim 1 or 5, in which hydrogen sulphide and hydrogen-containing gases resulting from the desulphurisation of the char are separated from the desulphurised char and are mixed with the remaining gaseous product prior to the removal of impurities from the remaining gaseous product.

7. A method as claimed in claim 1 in which at least a portion of the liquid hydrocarbon product separated from the remaining gaseous produced is fed to the combustion chamber of a gas turbine to form gaseous combustion products to drive the gas turbine to drive an electrical generator to produce electrical power.

8. A method as claimed in claim 1 in which hot exhausted combustion products from the, either or each, gas turbine are passed through one or more waste heat boilers to produce further steam to drive one or more steam turbines to drive an electrical generator to produce electrical power.

* * * * *